United States Patent [19]

Helsemans et al.

[11] Patent Number: 5,418,261
[45] Date of Patent: May 23, 1995

[54] POLYURETHANE FOAMS

[75] Inventors: Stefan E. L. Helsemans, Zellik; Gerhard Bleys, Heverlee, both of Belgium

[73] Assignee: Imperial Chemical Industries PLC, London, England

[21] Appl. No.: 174,908

[22] Filed: Dec. 29, 1993

Related U.S. Application Data

[63] Continuation-in-part of Ser. No. 46,244, Apr. 13, 1993, abandoned.

[30] Foreign Application Priority Data

Jan. 25, 1993 [GB] United Kingdom ............... 9301428

[51] Int. Cl.$^6$ ............................................. C08G 18/08
[52] U.S. Cl. .................................. 521/174; 521/159; 521/160; 521/914; 524/921
[58] Field of Search ............... 521/159, 160, 174, 914; 524/921; 264/230

[56] References Cited

U.S. PATENT DOCUMENTS

| | | | |
|---|---|---|---|
| 3,874,964 | 4/1975 | Cogliano et al. | 156/78 |
| 4,365,025 | 12/1982 | Murch et al. | 521/159 |
| 4,725,627 | 2/1988 | Arnason et al. | 521/65 |
| 5,032,622 | 7/1991 | Herrington et al. | 521/99 |

FOREIGN PATENT DOCUMENTS 0361418 4/1990 European Pat. Off. .
1491620 11/1977 United Kingdom .

*Primary Examiner*—John Kight, III
*Assistant Examiner*—R. F. Johnson

[57] ABSTRACT

A method for the preparation of shape memory polyurethane foams by reacting a polyisocyanate component and a polyol composition in the presence of a foaming agent comprising water wherein the polyisocyanate component contains at least 85% by weight of 4,4'-diphenylmethane diisocyanate or a variant thereof and the polyol composition comprises at least one polyoxyalkylene polyol containing oxyethylene residues, said polyol composition having an average nominal hydroxyl functionality of from 2.2 to 6, an average oxyethylene content of at least 86% by weight and an average hydroxyl equivalent weight from 250 to 1500.

8 Claims, No Drawings

POLYURETHANE FOAMS

CROSS-REFERENCE TO RELATED APPLICATIONS

The present application is a continuation-in-part of application Ser. No. 08/046,244 filed Apr. 13, 1993, now abandoned entitled "Polyurethane Forms".

The present invention relates to shape memory polyurethane foams. Polyurethane foams remain deformed if they are deformed at a temperature higher than the glass transition temperature (Tg) and then cooled below Tg in the deformed state. They recover their original shape when heated to a temperature higher than Tg.

The glass transition temperature (Tg) refers to the temperature at which the polyurethane undergoes its dominant glass transition as measured by dynamic mechanical thermal analysis (DMTA).

A foam having a Tg higher than the working temperature of the foam (usually room temperature) exhibits the shape memory property.

Shape memory polyurethane foams are described in EP-A-361418. They are obtained by first reacting a difunctional diisocyanate and a difunctional polyol to form a prepolymer, then adding a difunctional chain extender and a blowing agent, and finally heat-curing the resulting mixture. The blowing agent that can be used may be either of the decomposition type or of the evaporation type. Water is not mentioned and in the examples a chlorinated fluorocarbon is used as the blowing agent. Only one foam was made from 4,4'-MDI and a polyol having high oxyethylene content but it has a Tg of −6° C.

Polyols having higher oxyethylene contents, for example 50% or more on a weight basis are often employed as minor additives in flexible foam formulations to ensure that the foams have an open-cell structure. Contrarily, the use of these polyethers at higher concentrations in conjunction with the usual isocyanates results in closed cell foam.

It has now been found that shape memory foams having a Tg above ambient temperature can be successfully made from formulations containing high concentrations of polyols having higher oxyethylene contents, substantially pure 4,4'-MDI or a derivative thereof and water.

The foams of the present invention exhibit valuable properties and can be used in a wide range of applications.

Thus according to the invention, a method is provided for the preparation of shape memory polyurethane foams from a reaction mixture comprising a polyisocyanate component, a polyol composition and a foaming agent comprising water wherein the polyisocyanate component contains at least 70% and preferably at least 85% by weight of 4,4'-diphenylmethane diisocyanate or a variant thereof and the polyol composition comprises at least one polyoxyalkylene polyol containing oxyethylene residues, said polyol composition having an average nominal hydroxyl functionality of from 2.2 to 6, an average hydroxyl equivalent weight of from 250 to 1500 and an average oxyethylene content of at least 86% by weight and wherein the amount of water is 1.5-6% by weight based on the weight of the polyol composition and wherein the isocyanate index is 90-150.

The polyisocyanate component used in the method of the invention may consist essentially of pure 4,4'-diphenylmethane diisocyanate or mixtures of said diisocyanate with one or more other organic polyisocyanates, especially other diphenylmethane diisocyanate isomers, for example the 2,4'-isomer optionally in conjunction with the 2,2'-isomer. The polyisocyanate component may also be an MDI variant derived from a polyisocyanate composition containing at least 70% and preferably at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanate composition and/or by reacting such a composition with one or more low molecular weight polyols. The polyisocyanate component may comprise a minor proportion, i.e. less than 30% and preferably less than 15% by weight of polymethylene polyphenylene polyisocyanates having an isocyanate functionality of more than 2, like e.g. polymeric or crude MDI. Preferably the isocyanate functionality of the polyisocyanate component does not exceed 2.25.

The polyol composition may consist of a single polyoxyalkylene polyol having the required functionality, equivalent weight and oxyethylene content. Polyoxyethylene polyols are preferred, but polyols containing small amounts of alkylene oxides other than ethylene oxide, e.g. poly(oxyethylene-oxypropylene) polyols, may also be used. Such polyols are known in the art and may be obtained in conventional manner by reacting ethylene and if desired other alkylene oxides simultaneously and/or sequentially in any order with an initiator such as a polyol, a hydroxylamine, a polyamine and mixtures thereof having on average from 2.2 to 6 active hydrogen atoms. Examples of appropriate initiators include ethylene glycol, propylene glycol, butanediol, glycerol, trimethylol propane, pentaerythritol, xylitol, glucose, fructose, mannitol, sorbitol, ethanolamine and ethylenediamine and mixtures thereof and mixtures of such initiators with initiators having 2 active hydrogen atoms, like ethylene glycol, propylene glycol and butane diol, provided such mixtures have on average 2.2–6 active hydrogen atoms.

Alternatively, the polyol composition may comprise a mixture of two or more polyoxyalkylene polyols such that the total composition has the required average functionality, equivalent weight and oxyethylene content. The polyoxyalkylene polyols a present in such mixtures are preferably polyoxyethylene polyols or poly(oxyethylene-oxypropylene) polyols; small amounts, e.g. less than 10% by weight, of one or more polyoxypropylene polyols may also be present The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation.

It is preferred that the average nominal hydroxyl functionality of the polyol composition is from 4 to 6, the most preferred polyoxyalkylene polyols being hexols. Preferred polyol compositions further have an average oxyethylene content of at least 95% by weight and an average hydroxyl equivalent weight of from 250 to 1000 and most preferably of 250 to 600.

If desired, the polyoxyalkylene polyol (or one or more of the polyoxyalkylene polyols when a mixture of such is used) may contain dispersed polymer particles. Such polymer-modified polyols have been fully described in the prior art and include products obtained by the in situ polymerisation of one or more vinyl monomers, if or example acrylonitrile and styrene, in polyoxyalkylene polyols or by the in situ reaction between a polyisocyanate and an amino- or hydroxy-functional compound, for example triethanolamine, in the polyoxyalkylene polyol.

The foaming agent for use in, the method of the invention is water, optionally in conjunction with a physical blowing agent, for example a low boiling organo fluoro compound. The amount Of foaming agent may be varied in known manner in order to achieve the desired foam density, suitable amounts of water being, for example, from 1.5 to 6 by weight based on the weight of the polyol composition. Preferably water is the only foaming agent, in an amount of from 1.5 to 5% by weight based on the weight of the polyol composition. The isocyanate index used, taking account of the polyol composition, water and any other isocyanate-reactive species, for example chain extenders or cross-linking agents, is 90 to 150. Isocyanate index is the ratio of the number of NCO groups and of the active hydrogen atoms times 100.

The foam-forming reaction mixture may contain one or more of the additives conventional to such reaction mixtures. Such additives include catalysts, for example tertiary amines and tin compounds, surface-active agents and foam stabilisers, for example siloxane-oxyalkylene copolymers, chain extenders, for example low molecular weight diols or diamines, cross-linking agents, for example triethanolamine, flame retardants, organic and inorganic fillers, pigments,agents for suppressing the so-called boiling-foam effect like polydimethylsiloxanes and internal mould release agents. Although catalysts may be added to the foam forming reaction mixture, the reaction is preferably carried out in the absence of a catalyst.

Accordingly, in a further aspect, the invention provides a reaction system comprising:

(i) a polyisocyanate component containing at least 85% by weight of 4,4'-diphenylmethane diisocyanate or a variant thereof;

(ii) a polyol composition comprising at least one polyoxyalkylene polyol containing oxyethylene residues, said polyol composition having an average nominal hydroxyl functionality of from 2.2 to 6, an average hydroxyl equivalent weight of from 250 to 1500 and an average oxyethylene content of at least 86% by weight.

(iii) a foaming agent comprising water, and, optionally, (iv) one or more additives conventional to foam formulations. This reaction system is used for making shape memory foams. Reaction system in this context refers to a combination of chemicals wherein the polyisocyanates are kept in a container separate from the isocyanate-reactive compounds.

In operating the method of the invention, the known one-shot technique is preferred, but the semi-prepolymer and prepolymer process may also be used. The foams may be produced in the form of slabstock or mouldings.

The foams of the present invention are easily recyclable and are suitable as light weight alternatives for traditional energy absorbing applications, such as bumpers and side impact bolsters in automobile doors, and for insulation and packaging purposes.

The invention is illustrated but not limited by the following Examples in which all parts, percentages and ratios are by weight.

EXAMPLES

Foams were made by bench mixing the formulations given in the table below using a one-shot technique. Foaming reaction mixtures were poured in an open mould. After curing for 5 minutes the foams were demoulded and hand crushed.

TABLE

| Experiment | 1 | 2 | 3 | 4 | 5 | 6 | 7 | 8 | 9 | 10 |
|---|---|---|---|---|---|---|---|---|---|---|
| Polyol A | 95 | 99 | 87 | 90 | 100 | 100 | 50 | 100 | 80 | — |
| Polyol B | — | — | — | — | — | — | 50 | — | — | — |
| Polyol C | 3 | — | 3 | 3 | — | — | — | — | — | — |
| Polyol D | 2 | 1 | — | — | — | — | — | — | 20 | — |
| Polyol E | — | — | 10 | — | — | — | — | — | — | — |
| Polyol F | — | — | — | 7 | — | — | — | — | — | — |
| Polyol G | — | — | — | — | — | — | — | — | — | 100 |
| Water | 4 | 3 | 4 | 4 | 4 | 3 | 3 | 3 | 3 | 5 |
| Catalyst 1 | — | — | — | — | — | — | 0.1 | — | — | — |
| Catalyst 2 | — | — | — | — | — | — | — | — | — | 1.0 |
| Polyisocyanate | I | I | I | I | I | I | I | II | I | I |
| Index | 100 | 100 | 100 | 100 | 100 | 140 | 100 | 100 | 100 | 100 |
| Tg (°C.) | 80 | 50 | 75 | 75 | NM | NM | NM | NM | NM | NM |

| Experiment | 11 | 12 | 13 | 14 | 15 | 16 | 17 | 18 |
|---|---|---|---|---|---|---|---|---|
| Polyol A | 97 | 97 | 97 | 97 | 97 | 97 | 97 | 97 |
| Polyol C | 3 | 3 | 3 | 3 | 3 | 3 | 3 | 3 |
| Water | 3 | 3 | 3 | 1 | 8 | 3 | 3 | 3 |
| Polyisocyanate | III | III | III | III | III | III/II 81/9, w/w | III/II 63/27, w/w | III/II 27/63, w/w |
| Index | 40 | 60 | 200 | 100 | 100 | 100 | 100 | 100 |
| Comment | 1 | 2 | 1 | 1 | 2 | shape memory foam | shape memory foam | soft foam having hardly shape |

TABLE-continued memory proper ties

Polyol A: polyoxyethylene sorbitol having a molecular weight of 1800.
Polyol B: polyethylene glycol having a molecular weight of 600.
Polyol C: glycerol-initiated polyoxypropylene oxyethylene triol having a molecular weight of 3500 and 50% random oxyethylene groups.
Polyol D: polyoxypropylene glycol having a molecular weight of 2000.
Polyol E: polyoxypropylene glycol having a molecular weight of 1025.
Polyol F: polyoxypropylene glycol having a molecular weight of 425.
Polyol G: trimethylol propane-initiated polyoxyethylene oxypropylene triol having a molecular weight of about 4000 and 77% random oxyethylene content.
Catalyst 1: DABCO 33LV; commercially available from Air Products (DABCO is a trademark of Air Products)
Catalyst 2: mixture of 0.87% dibutyl tin dilaurate and 0.13% D 80/20 (mixture of DABCO and dimethylethanolamine).
Polyisocyanate I: MDI-composition containing 71% 4,4'-MDI and 27% uretonimine-modified 4,4'-MDI having an NCO-content of 29,3%.
Polyisocyanate II: polymeric MDI having an NCO-content of 30.7% containing 39% 4,4'-MDI.
Polyisocyanate III: a 50/50 w/w mixture of 4,4'-MDI and Polyisocyanate 1.
NM: not measured.
Comment 1: No shape memory foam was obtained.
Comment 2: No foam was obtained.

Experiments 1–7 and 16 and 17 are according to the invention. In the comparative experiments 8–10 it was not possible to make acceptable foams. The cells of the foams obtained in experiment 8 were totally closed and the foams could not be crushed, in experiment 9 no foam could be made due to the boiling effect in the formulation and in experiment 10 the foam was flexible and had no shape memory properties. In experiments 11–13 no shape memory foams could be made, showing that the lower and higher isocyanate index can not be used. Experiments 14 and 15 did not result in shape memory foams, showing that the amount of Water should be maintained between limited ranges. Experiment 18 shows that at a relatively low amount of 4,4'-MDI the foam is loosing shape memory properties.

We claim:

1. A method for the preparation of shape memory polyurethane foams by reacting a polyisocyanate component and a polyol composition in the presence of a foaming agent comprising water wherein the polyisocyanate component contains at least 70% by weight of 4,4'-diphenylmethane diisocyanate or a variant thereof and the polyol composition comprises at least one polyoxyalkylene polyol containing oxyethylene residues, said polyol composition having an average nominal hydroxyl functionality of from 2.2 to 6, an average oxyethylene content of at least 86% by weight and an average hydroxyl equivalent weight from 250 to 1500 and wherein the amount of water is 1.5–6% by weight based on the weight of the polyol composition and wherein the isocyanate index is 90–150.

2. A method according to claim 1 wherein the polyoxyalkylene poly is a polyoxyethylene polyol.

3. A method according to claim 1 wherein the polyol composition has an average nominal hydroxyl functionality of from 4 to 6.

4. A method according to claim 1 wherein the polyol composition comprises at least one polyoxyethylene hexol.

5. A method according to claim 1 wherein the polyol composition has an average oxyethylene content of at least 95% by weight and an average hydroxyl equivalent weight of 250 to 600.

6. A method according to claim 1 wherein the reaction is carried out in the absence of a catalyst.

7. A method according to claim 1 wherein water is used as the sole blowing agent in an amount of 1.5–5% by weight based on the weight of the polyol composition.

8. A reaction system comprising:
(i) a polyisocyanate component containing at least 70% by weight of 4,4'-diphenylmethane diisocyanate or a variant thereof;
(ii) a polyol composition comprising at least one polyoxyalkylene polyol containing oxyethylene residues, said polyol composition having an average nominal hydroxyl functionality of from 2.2 to 6, an average hydroxyl equivalent weight of from 250 to 1500 and an average oxyethylene content of at least 86% by weight;
(iii) a foaming agent comprising 1.5–6% by weight of water based on the weight of the polyol composition, and, optionally,
(iv) one or more additives conventional to foam formulations, the relative amounts of polyisocyanates and isocyanate-reactive compounds being such that the isocyanate index is 90–150.

* * * * *